United States Patent
Elvegaard

(10) Patent No.: US 6,173,926 B1
(45) Date of Patent: Jan. 16, 2001

(54) CLAMPING DEVICE FOR CLAMPING OF TUBES OR THE LIKE

(76) Inventor: Eilif Elvegaard, Sigrid Undsets vei 32, N-600 Fredrikstad (NO)

(*) Notice: Under 35 U.S.C. 154(b), the term of this patent shall be extended for 0 days.

(21) Appl. No.: 09/155,559

(22) PCT Filed: Mar. 25, 1997

(86) PCT No.: PCT/NO97/00084
§ 371 Date: Dec. 21, 1998
§ 102(e) Date: Dec. 21, 1998

(87) PCT Pub. No.: WO97/37164
PCT Pub. Date: Oct. 9, 1997

(30) Foreign Application Priority Data

Apr. 1, 1996 (NO) .................................................. 961327

(51) Int. Cl.[7] .................................................. F16L 3/08
(52) U.S. Cl. .................................... 248/74.1; 248/68.1
(58) Field of Search .......................... 248/74.1, 68.1, 248/65

(56) References Cited

U.S. PATENT DOCUMENTS

| | | | |
|---|---|---|---|
| 2,361,943 | * 11/1944 | Issoglio et al. | 174/135 |
| 2,362,124 | * 11/1944 | Ellinwood | 174/135 |
| 2,674,772 | * 4/1954 | Jacobs | 24/115 R |
| 2,761,714 | * 9/1956 | Cuskie | 403/225 |
| 2,890,848 | 6/1959 | Johnson, Jr. | 248/74 |
| 2,937,835 | 5/1960 | Csmereka | 248/74 |
| 2,998,217 | 8/1961 | Englis et al. | 248/74 |
| 3,216,683 | * 11/1965 | Girard | 248/68.1 |
| 3,856,244 | * 12/1974 | Menshen | 248/67.5 |
| 4,037,810 | * 7/1977 | Pate | 248/68.1 |
| 4,172,578 | 10/1979 | Pate | 248/74 R |
| 4,273,465 | * 6/1981 | Schoen | 403/391 |
| 5,887,832 | * 3/1999 | Elvegaard | 248/68.1 |

FOREIGN PATENT DOCUMENTS

WO 93/01439   7/1992   (WO) .

* cited by examiner

Primary Examiner—Anita M. King
(74) Attorney, Agent, or Firm—Rockey, Milnamow & Katz, Ltd.

(57) ABSTRACT

A clamp device for clamping of at least one tube or the like to a support, comprising a base member (1) having at least one recess (4, 5) for receiving the tube (6) or the like, possibly a top plate (14) at the side of the base member facing away from the support (7), and at least one locking screw (8 resp. 9) carried through mutually aligned holes (15, 10, 11 resp. 16, 12, 13) in the top plate and the base member. The locking screw has a head (17 resp. 18) at one end and a nut (21 resp. 22) at the other end, for keeping the components of the clamp device together as an assembled unit without any loose parts, the head (17 resp. 18) of the screw being arranged to be carried through an elongated hole (19 resp. 20) in the support and locked thereto by tightening of the nut. The base member consists of two halves (2, 3) of which at least one half (3) has at least one recess (5) for clamping receipt of the tube or tubes (6), and the hole or holes (10, 11, 12, 13) through the halves (2, 3) has/have a radial enlargement (24) along a part of its length, so that the head of the associated locking screw can pass into the half (3) nearest to the support (7) or through this half and partly into the other half (2), to allow a limited relative movement of the halves and allow lateral introduction of a tube (6) into the recesses (4, 5).

13 Claims, 3 Drawing Sheets

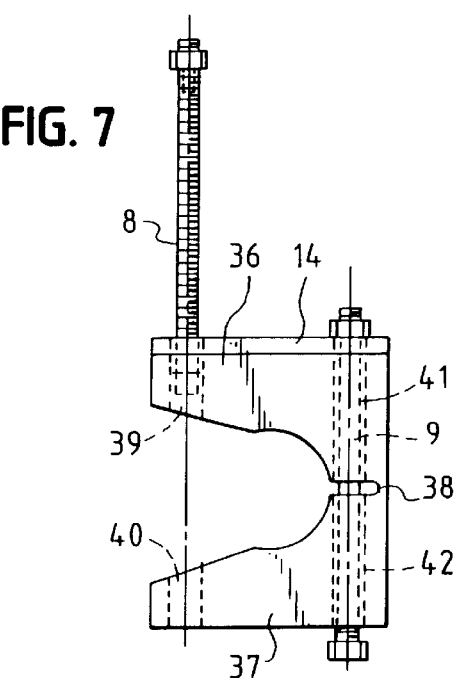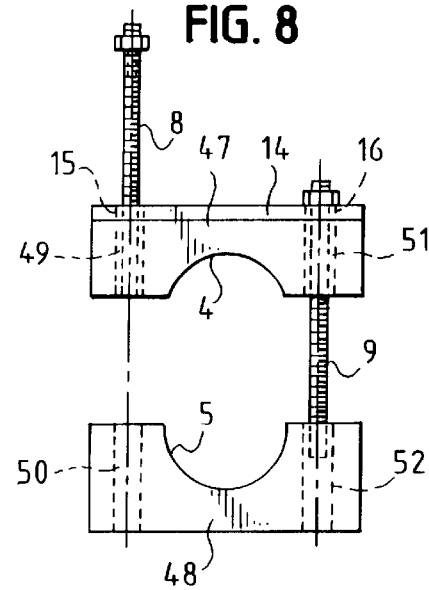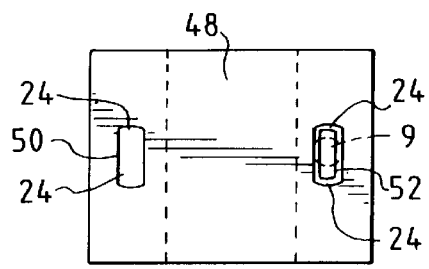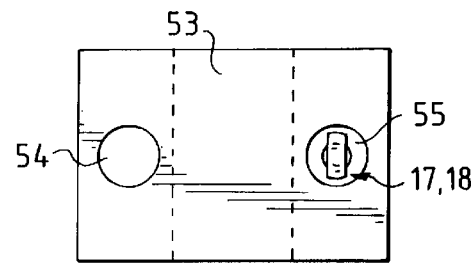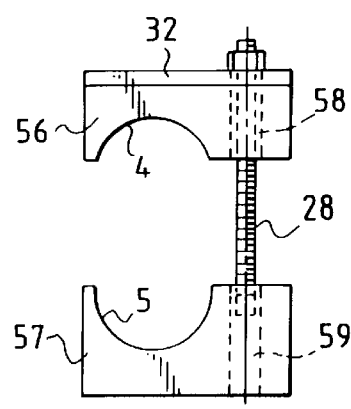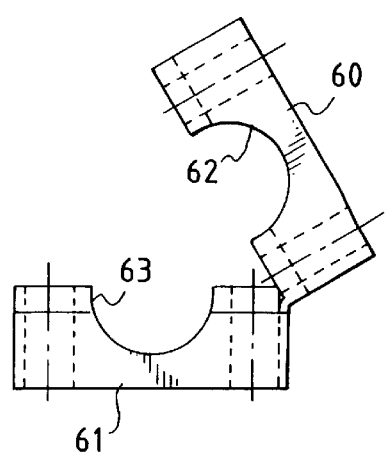

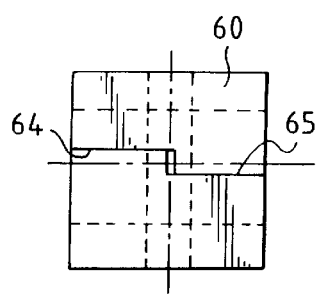
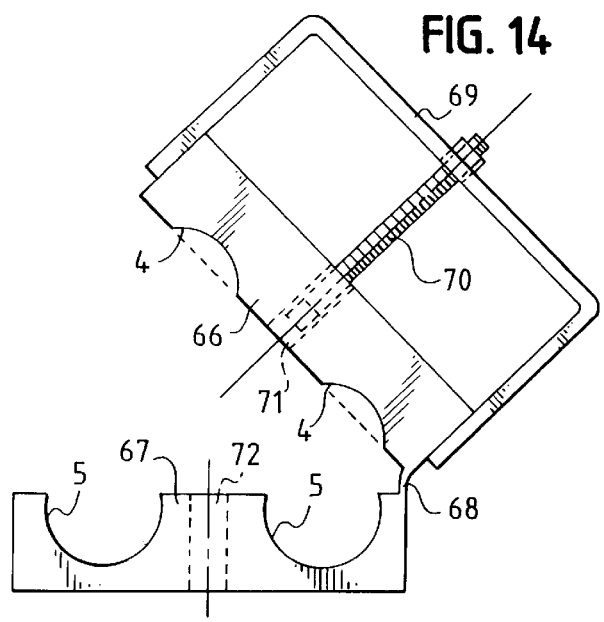
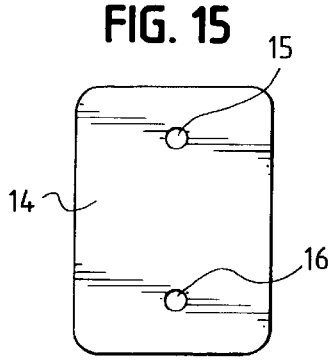
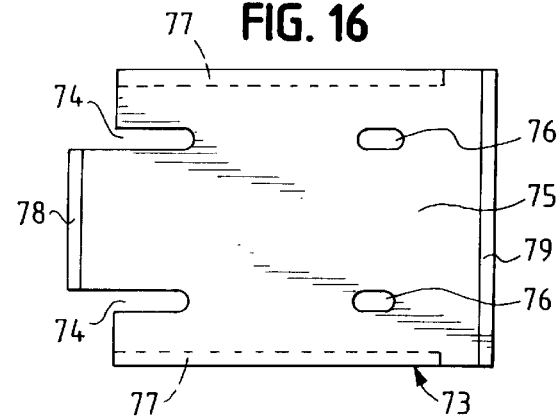
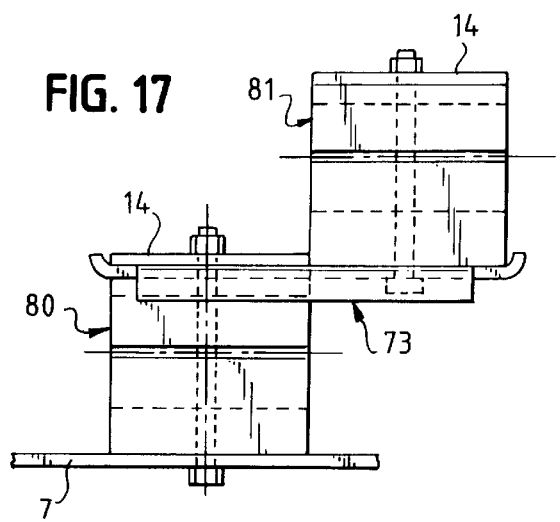
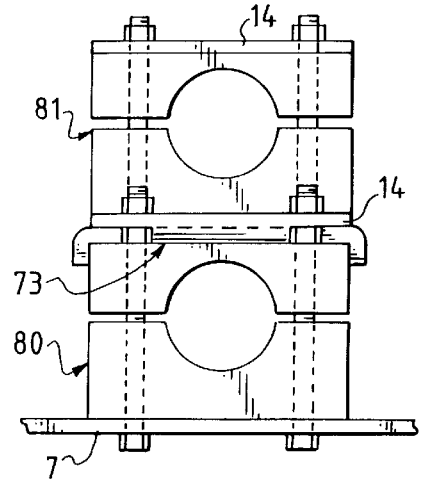

CLAMPING DEVICE FOR CLAMPING OF TUBES OR THE LIKE

FIELD OF THE INVENTION

The invention relates to a clamp device for clamping one or more tubes or the like to a support, comprising a base member having at least one outwardly open, at least partly cylindrical recess for receiving a tube or the like, possibly a top plate for abutment against the base member at the side facing away from the support, and at least one fastening element in the form of a locking screw carried through mutually aligned holes in the possible top plate and the base member, and which is of the type which, by means of a head at one end and a nut at the other end, keeps the components of the clamp device together as a completely preassembled ready-to-mount unit without any loose parts, the head of the screw being located at the end to be fastened to the support and being arranged to be carried through a hole or groove in the support adapted to the head, and to be locked thereto by tightening of the nut.

A clamp device of the above-mentioned type is known from Norwegian Patent No. 174 402. Such a clamp device has a number of advantages in relation to conventional clamp devices consisting of several loose parts and therefore being relatively time-consuming to mount or dismount. Thus, advantages are achieved both with respect to manufacture, storage maintenance, ordering of parts, mounting/dismounting time and total cost. The clamp can be delivered to the user completely assembled with all parts, ready for use and consisting of only one unit, without any loose parts of any kind. None of the component parts are to be separated from the clamp device before mounting, and neither in case of dismounting. Thus, the clamp is in the same condition also after dismounting, and may be used once more.

In the known clamp device of this type the base member consists of a single part, and its outwardly open recess is formed at its opening with a constricted portion to grip and retain a tube which is introduced laterally and pressed in place in the recess. This entails that the base member exerts a limited clamping action on the introduced tube. Therefore, clamps of this type are best suited for clamping of quite small tubes where there is not required a high strength in the connection.

The object of the invention therefore is to provide a clamp device which is also suited for clamping of tubes of larger dimensions, an efficient clamping of the tube or tubes being obtained when the clamp device is mounted, at the same time as the above-mentioned advantages of this type of clamp device is retained.

The above-mentioned object is achieved with a clamp device of the introductorily stated type which, according to the invention, is characterized in that the base member consists of to halves of which at least one half has at least one recess for receiving the topical tube or tubes in a clamping manner between the halves when these are pressed against each other, and that the hole or holes through the halves is/are formed with a radial enlargement along at least a part of its length, so that the head of the associated locking screw can pass at least partly into the half nearest to the support or through this half and partly into the other half, to allow a limited relative movement of the halves and allow a lateral introduction of a tube into the recesses.

DESCRIPTION OF THE RELATED ART

The clamp device can be used in the clamping of tubes, cables or the like, singly or several next to each other.

In an advantageous embodiment of the clamp device, the base halves are provided with at least one pair of mutually facing, cooperating recesses for the receipt of the respective tube. In such an embodiment it is also advantageous that at least one of the two cooperating recesses has a constriction portion at its opening, for gripping and retention of a tube introduced into the recess. The desired number of clamp devices then can be snapped onto the tube, so that the tube with applied clamps can be transported as a unit to the place of mounting. The property that the clamp can be premounted on the tube, in many cases will have great installation advantages.

BRIEF DESCRIPTION OF THE SEVERAL VIEWS OF DRAWINGS

The invention will be further described below in connection with a number of exemplary embodiments with reference to the drawings, wherein FIG. 1 shows a front view of a first embodiment of a clamp device according to the invention;

FIG. 7 shows the embodiment in FIG. 6 prepared for introduction of a tube which is to be clamped;

FIG. 8 shows a front view of a fourth embodiment of the clamp device;

FIG. 9 shows a view viewed from below of the lower base half in FIG. 8;

FIG. 10 shows a view corresponding to FIG. 9, but of an alternative embodiment;

FIG. 11 shows a front view of a fifth embodiment of the clamp device;

FIG. 12 shows a front view of an embodiment of the clamp device generally corresponding to FIG. 1, but of an embodiment wherein both recesses grip about the tube;

FIG. 13 shows a side view of the embodiment in FIG. 12 wherein the halves are moved together;

FIG. 14 shows a front view of a sixth embodiment of the clamp device;

FIG. 15 shows a plan view of a top plate, as it is formed in the embodiment according to FIGS. 1–3 and 6–8;

FIG. 16 shows an embodiment of a separate top plate for building-on of an additional clamp; and FIGS. 17 and 18 show a side view and a front view, respectively, of a clamp device having a separate top plate and a built-on additional clamp device thereon.

Corresponding or similar members have been designated by the same reference numerals in the different drawing figures.

DETAILED DESCRIPTION OF THE INVENTION

Figure 1:
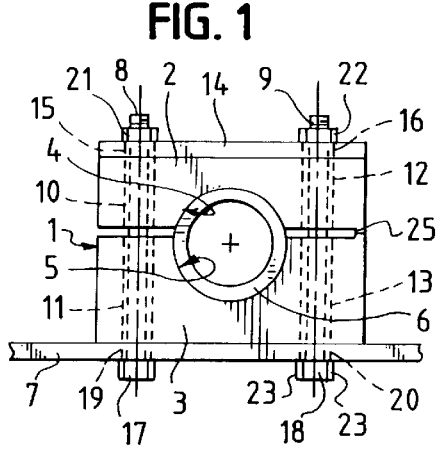
Figure 2:
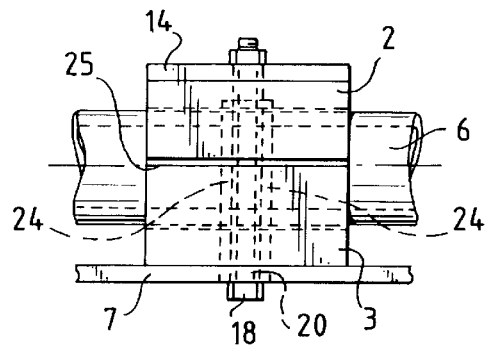
FIG. 2 shows a side view of the embodiment in FIG. 1.
Figure 3:
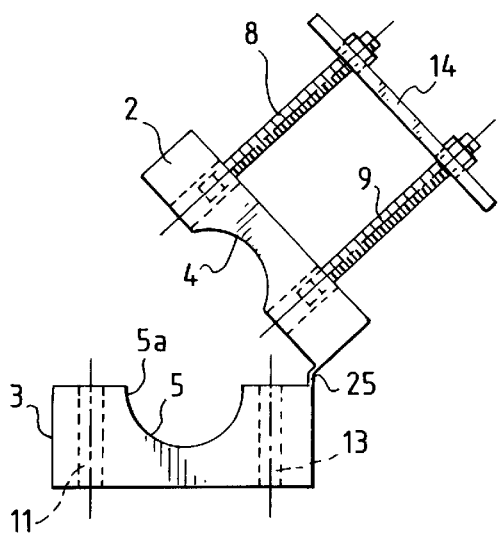
FIG. 3 shows the embodiment in FIG. 1 prepared for introduction of a tube which is to be clamped.

The embodiment of the clamp device according to the invention shown in FIGS. 1–3, comprises a base member 1 consisting of a pair of halves 2, 3 which are provided with a respective one of two mutually facing, cooperating recesses 4, 5 for the receipt of a suitably dimensioned tube or pipe 6. The recesses 4, 5 are partly cylindrical, with an axis which is parallel to the axis of a tube placed in the recesses. Further, the recesses are formed in such a manner in relation to the tube that this is received in a clamping manner when the base halves 2, 3 are pressed against each other. In the shown embodiment the recesses have a part-circular contour having the same radius of curvature, as viewed in a cross-section perpendicular to the longitudinal axis of the recesses (and the tube). The cross-sectional contour of the lower recess 5 is somewhat larger than a semi-circle, so that the recess at its opening has opposite constriction portions 5a (see FIG. 3), so that the recess at its opening is narrower than the outer diameter of the tube and thereby grips and retains a tube which is introduced laterally and pressed in place in the recess. To enable introduction of the tube 6 into the recess 5, the base halves in the embodiment shown in FIGS. 1–3, and also in remaining partly corresponding embodiments, are made of a suitable elastic material, such as a suitable plastics. It is clear, however, that with an appropriate dimensional adaptation also the base half having a recess with a constricted opening portion possibly may be of metallic material.

The upper recess 4 is shown to have a cross-sectional contour which is somewhat smaller than a semi-circle and is so adapted relative to the other recess that the base halves clamp the tube placed in the recess when they are pressed against each other without their opposite surfaces coming quite into contact with one another, as appears from FIG. 1.

As will be understood, the recesses may be formed in many different ways with respect to cross-sectional shape. For example, both recesses partly may be formed such that they grip about and retain a positioned tube, as shown in FIG. 12. As another alternative, both recesses may be formed with a cross-sectional contour which is less than a semi-circle, so that the tube is clamped by the base halves pressed against each other, with a greater distance between the halves than what is shown in FIG. 1. In this case then, none of the recesses are formed to retain on its own a tube placed therein.

The base halves 2, 3 are fastened to a foundation or support 7 by means of two fixing screws 8, 9 carried through respective mutually aligned holes 10, 11 and 12, 13 extending through the base halves on either side of the recesses 4, 5, substantially at right angles to the longitudinal axis thereof. A top plate 14 is placed on the upper side of the upper base half 2, and the fixing screws 8, 9 are also carried through respective holes 15, 16 in the top plate, these holes being aligned with the respective holes 10, 11 and 12, 13 in the base halves 2, 3. The top plate is made of a metallic material which is to ensure the tube or tubes against falling out in a possible fire at the place of use in case the base halves of the clamp are of a combustible material.

It is to be remarked that even if the embodiments of the clamp device shown in the drawings are based on the use of a separate top plate, the clamp device may also be without such a top plate, especially in cases wherein a top plate (of metal) is not required to be used for security reasons, e.g. in case of a fire. As will be clear, a top plate will also be unnecessary in embodiments wherein the base halves, or at least the upper base half, consist of a non-combustible material, for example a metal. It will also be clear that in the embodiment wherein the upper base half is not provided with a recess (see FIG. 14), and especially where it is made of metal or another non-combustible material, the top plate will be superfluous.

The fixing screws of the clamp device are constituted by head screws keeping the components or constituent parts of the clamp together as a preassembled and ready-to-mount unit without any loose parts. For this purpose the screws, at the end which is to be fixed to the support, have a head which can be carried through an adapted hole or groove in the support, and be locked against the support by tightening of a locking nut threaded onto a thread at the other end of the screw.

In the shown embodiment the fixing screws 8, 9 are locking screws of a known and commercially available type designated T-screws. As shown in FIGS. 1–3, these screws have a T-shaped head 17 and 18, respectively, which can be carried through an adapted oblong hole 19 and 20, respectively, in the support 7, and which under the head has a pair of stop lugs (not shown) where one lug, with 90° rotation of the screw, locks this screw against continued rotation in the hole with tightening of the screw's associated nut 21 and 22, respectively, which is of the locking-nut type and consequently sits sluggishly on the screw thread, to ensure rotation of the screw to the locking position and loosening position, respectively, of the head. (The other lug prevents rotation of the screw when loosening the nut in question.) The holes in the support may have the same shape as the holes shown in the separate top plate in FIG. 16 to be described later.

As an alternative to the above-mentioned T-screws, the fixing screws may be locking screws having a head which can be carried through a keyhole-shaped hole in the support, and having a shoulder formed under the head, usually with a rectangular cross-section, and which, when introduced into the narrow portion of the "keyhole", locks the screw against rotation, so that its nut can be tightened. (This embodiment is not shown in the drawings).

It will be clear that the length of the locking screw in practice will be adapted to the thickness of the topical support, so that the desired locking is achieved immediately when the locking screws of the clamp device are moved in place in the intended holes in the support and the locking nuts are tightened with a suitable spanner.

In order to be able to carry out a lateral introduction of a tube into a clamp device according to the invention, or to be able to remove a mounted clamp device from a tube, the base halves must be able to be moved sufficiently far away from each other to allow such an introduction or removal, at the same time as a possible preventing locking screw must be able to be pulled away from the introduction or dismounting opening, and at the same time as the components of the clamp device all the time are to be kept together as a unit without any loose parts. To be able to carry out these operations, the hole or holes through the base halves is/are formed with a radial extension or enlargement along at least a part of its length, so that the head of the associated locking screw can pass at least partly into the half nearest to the support or through this half and partly into the other half. In this manner one obtains the necessary "freeing movement" of the locking screws, in order to allow a limited relative movement of the halves, and to allow a lateral introduction of a tube or the like into the recesses.

The embodiments shown in the drawings, wherein the locking screws 8, 9 are so-called T-screws with laterally projecting head portions 23, the above-mentioned radial extension or enlargement consists of diametrically opposite, axially extending spaces 24 to make room and passage for the projecting head portions 23. This embodiment with a radial enlargement of the screw holes in the form of axially extending spaces 24 is also shown in FIG. 9.

In the embodiment according to FIGS. 1–3, the two base halves 2, 3 are connected to each other in a hinge portion 25 located at one side edge of the halves and having a hinge axis which is parallel to the longitudinal axis of the recesses 4, 5. Further, the holes for the locking screws 8, 9 are shaped such that the radial enlargement 24 of each of the two pairs 10, 11 and 12, 13 of aligned holes in the halves 2, 3 extends through the half 3 nearest to the support 7 and a limited distance into the other half 2, as best shown in FIG. 2. Thus, the head of the locking screw can pass freely through the holes in the base half 3, the hinge portion keeping the base halves together.

When a tube which is to be clamped, is to be inserted into the clamp device according to FIGS. 1–3, the top plate 14 together with the locking screws 8, 9 are lifted up to the position shown in FIG. 3. Thereafter the upper half 2 is turned about the hinge 25, so that a free opening for lateral introduction of the tube 6 is provided. When the tube is located over the recess 5, the base half 3 is pressed in place on the tube. Thereafter the upper base half 2 is pivoted down onto the tube, and the locking screws 8, 9 are carried through the holes in the lower half 3 and the holes in the support at the same time as the top plate 14 is moved down onto the upper base half. Thereafter the nuts 21, 22 can be tightened, so that the clamp device is locked to the support.

Figure 4:
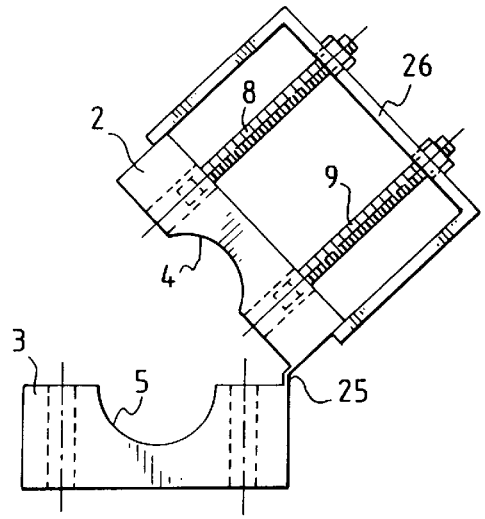
FIG. 4 shows a view corresponding to FIG. 3 of an embodiment wherein the top plate is formed as a bow or strap.

When the base halves are made of a plastic material, it may be of interest to have a steel bow or strap around the clamp to prevent the installed tube or tubes from falling out in a possible fire at the place of use. FIG. 4 shows a front view of such an embodiment which is provided with a strap 26 which simultaneously constitutes the top plate of the clamp. In other respects the embodiment corresponds to the embodiment according to FIGS. 1–3. Such a strap embodiment or a similar embodiment may be used in all the illustrated clamp embodiments.

Figure 5:
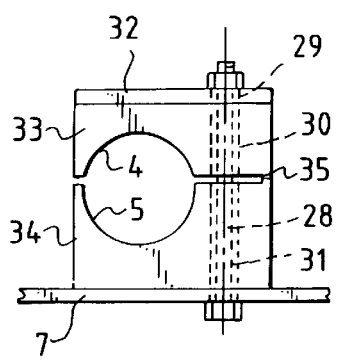
FIG. 5 shows a front view of a second embodiment of the clamp device.

FIG. 5 shows a second embodiment of the clamp device comprising a single locking screw 28 extending through respective aligned holes 29, 30, 31 in the top plate 32 and the base halves 33, 34 at one side of the recesses 4, 5. The base halves 33, 34 are hinged to one another at a hinge portion 35 in a corresponding manner as in the embodiment according to FIGS. 1–3. The radial enlargement of the pair of aligned holes 30, 31 in the base halves 33, 34 extends through the entire half 34 nearest to the support 7 and a limited distance into the other half 33. Consequently, the clamp device can be opened for tube introduction in a similar manner as described above in connection with FIG. 3.

Figure 6:
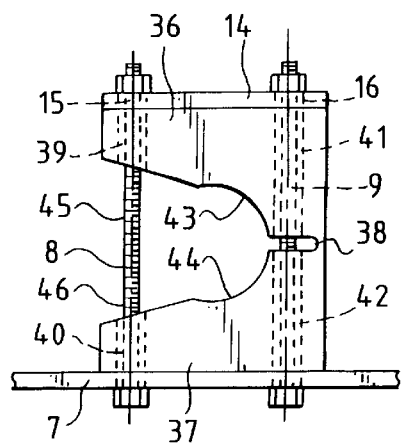
FIG. 6 shows a front view of a third embodiment of the clamp device.

FIGS. 6 and 7 show a third embodiment of the clamp device resembling the embodiment according to FIGS. 1–3, the embodiment comprising two base halves 36, 37 which are hinged to one another at a hinge portion 38, and two locking screws 8, 9 extending through respective aligned holes 15, 39, 40 and 16, 41, 42, respectively, in the top plate 14 and the base halves on either side of the recesses 43, 44. Whereas the embodiments according to FIGS. 1–3 and FIG. 5 in principle can have more than one pair of cooperating recesses 4, 5 to receive one or more tubes, cables or the like, each base half in the embodiment in FIG. 6 has a single recess 43 and 44, respectively, each recess also having a laterally debouching portion 45 and 46, respectively, on the side of the half located opposite to the hinge portion 38, so that there is formed a lateral introduction opening for a tube (not shown). The pair of aligned holes 39, 40 at the laterally debouching portions 45, 46 has a radial enlargement (24 in FIG. 2) extending through the entire half 37 nearest to the support 7 and a limited distance into the other half 36, whereas the other pair of aligned holes 41, 42 is without such a radial enlargement.

As shown in FIG. 7, in this embodiment it is only necessary to lift up one locking screw 8 to make room for introduction of the tube which is to be clamped, there being no need for a larger movement in the hinge 38 than what is allowed by the clearance between the locking screw 9 and the holes 41, 42 through the base halves 36, 37. Thus, this embodiment of the clamp device can be fastened with the one screw 9 to the support 7 before the tube is moved in place in the recesses. This may often be a great installation advantage.

FIG. 8 shows a fourth embodiment of the clamp device according to the invention. The embodiment comprises a pair of separate base halves 47, 48, i.e. which are not connected to one another in a hinge portion, and a pair of locking screws 8, 9 extending through respective aligned holes 15, 49, 50 and 16, 51, 52, respectively, in the top plate 14 and the base halves on either side of the recesses 4, 5. The radial enlargement (24 in FIG. 2) of one pair of aligned holes 49, 50 extends through the entire base half 48 nearest to the support 7 (FIG. 1) and a limited distance into the other half 47, whereas the radial enlargement of the second pair of aligned holes 51, 52 extends only a chosen distance into the half 48 nearest to the support.

FIG. 9 shows a plan view of the lower base half 48 in FIG. 8, to visualize the radial enlargements 24 which are shown to consist of diametrically opposite, axially extending grooves for receiving the projecting portions 23 (FIG. 1) of the heads 17, 18 of the locking screws 8, 9.

FIG. 10 shows a bottom view corresponding to that of FIG. 9, but of an alternative embodiment wherein the radial enlargements of the holes through the base half 53 in question consist of circularly cylindrical enlargements, i.e. enlarged or extended holes 54 and 55, respectively, with a sufficiently large diameter to accommodate the heads 17, 18 of the locking screws with a certain play or clearance. This embodiment of the radial enlargements may be advantageous as it does not require any orientating turning of the locking screws in dismounting of a clamp device, for positioning of the projecting portions of the screw heads in alignment with the axial grooves, as in the embodiments described above. However, this embodiment requires somewhat larger base halves, to accommodate the extended, larger holes.

FIG. 11 shows a fifth embodiment of the clamp device wherein the base halves 56, 57 are separate parts as in FIG. 8, but where the device comprises a single locking screw 28, as in FIG. 5. The radial enlargement (24 in FIGS. 2 and 9) of the pair of aligned holes 58, 59 here extends only a chosen distance into the base half 57 nearest to the support 7 (FIG. 5), so that the halves can be moved sufficiently far from one another to allow introduction of a tube into the recesses 4, 5.

In the exemplary embodiments according to FIGS. 1, 5, 8 and 11 the recess in one of the base halves is shaped to "grip around" the topical tube which is to be clamped. Also in the embodiment according to FIG. 6 the recesses are shaped so that they together grip around the tube which is to be clamped, so that the clamps can be clipped onto a tube before final mounting to a support.

FIGS. 12 and 13 show a front view and a side view, respectively, of an alternative embodiment having a pair of hinged base members 60, 61 wherein both recesses 62, 63 in the base halves are shaped so that they partly grip about the tube to be clamped, each recess along a part of its length having a cross-sectional contour which is somewhat larger than a semicircle, like the recess 5 in the previous embodiments. As appears from FIG. 13, each recess has a stepped portion 64, 65 along half of its length, to make room for the tube-gripping portion of the other recess when the base halves are moved together.

FIG. 14 shows a front view of a sixth embodiment of the clamp device wherein the base halves 66, 67 of the device are provided with two pairs for cooperating recesses 4, 5 for clamping of two tubes. The base halves are hinged to each other in a hinge portion 68, and the top plate 69 is shaped as a U-formed bow or strap, in a manner corresponding to that of the embodiment in FIG. 4. The clamp device has a single locking screw 70 extending through aligned holes 71, 72 in the base halves between the two pairs of recesses. The radial enlargement (24 in FIG. 2) of the holes is arranged in the same manner as in the embodiment according to FIG. 1 or FIG. 5.

In the embodiment in FIG. 14, the recesses 4 in the base half 66 are shown to be relatively small or shallow. As suggested with stippled lines at the mouths of the recesses, these recesses possibly may be completely omitted, as also mentioned above. Such an embodiment, wherein only one or the lower base half is provided with one or more recesses, will be suitable for clamping of tubes with different dimensions, as suitable, part-cylindrical bushings or linings can be inserted into the recesses, for receiving corresponding tubes having smaller dimensions than that which is suitable for the recess 5 in the base half 67.

FIG. 15 shows a plan view of the top plate 14 used in the embodiments according to FIGS. 1, 6, 8 and 12. This top plate may be provided with a portion which projects outside the base member of a clamp device, and which is provided with at least one hole or groove which is adapted for introduction and locking of an associated locking screw in an additional, corresponding clamp device.

Instead of a top plate having an integral, projecting portion, as mentioned above, it may be expedient to use a separate top plate or build-on plate when it is of interest to build an additional clamp on top of an already mounted clamp device. An embodiment of such a separate top plate is shown in FIG. 16. This top plate 73 is adapted to be introduced under the top plate 14 of the clamp device parallel with the recess axis, as shown in FIG. 17. The top plate has a pair of outwardly open cutouts or slots 74 for receiving a correspondingly located locking screw (8 and 9 in FIG. 1), and further it has a portion 75 which in mounted position projects outside the base members and which is provided with a pair of holes or grooves 76 for introduction and locking of a respective locking screw in an additional, corresponding clamp device. As shown, the plate 73 is provided with downwardly projecting side flanges 77 for abutment against the side surfaces of an underlying clamp device. Further, the plate at one end has an upwardly projecting flange 78 for guiding abutment against the top plate 14 on the already mounted clamp device, and at the other end has an upwardly projecting flange 79 for abutment against a front edge of the added clamp.

FIGS. 17 and 18 show a side view and a front view, respectively, of a clamp device 80 which is mounted on a support 7, and an additional, corresponding clamp device 81 which is built-on onto the first one by means of the separate top plate 73. When mounting the additional clamp device 81, the nuts of the locking screws are first loosened on the already mounted clamp device 80 so much that the adapted end of the separate top plate can be inserted under the assembled top plate 14, the locking screws being inserted in the slots 74, whereafter the nuts can be tightened again.

It will be clear that separate top plates for building-on of additional clamp devices can be shaped in many different ways, dependent on the intended purpose, for example also for building-on of clamp devices having only one locking screw, e.g. according to the embodiment in FIG. 5. Such separate top plates may also have side flanges projecting quite down to the support, in a manner corresponding to that of the strap-formed plate 26 in FIG. 4. As another alternative in connection with clamp devices having only one locking screw, the separate plate may be shaped as a bracket having a U-formed cross-section, wherein the legs of the U form upper and lower horizontal flanges which are adapted for introduction respectively above and below the already mounted clamp device. With tightening of the nut of the locking screw, the lower flange is clamped between the support and the clamp, and the upper flange is clamped by the top plate of the clamp.

As regards the support for mounting of the clamps according to the invention, this may have a standardized perforation pattern for receiving the topical type of locking screws. It may also be practical to make use of prefabricated brackets with adapted holes, either for welding to a steel support or for screw attachment, or standard elements, such as cableways, cable ladders and profiles/rails having grooves suitable for the screw heads of the clamp device. Such elements are cut to desired lengths on the place of mounting.

What is claimed is:

1. A clamp device for clamping one or more cylindrical elements having a circular cross-section to a support, comprising an essentially block-shaped base member having at least one outwardly open, at least partly cylindrical recess for receiving such a cylindrical element, a top plate for abutment against the base member at the side facing away from the support, and at least one locking screw which is carried through mutually aligned holes in the top plate and the base member and which has a head at a first end and a nut at a second end, and which keeps the base member and the top plate of the clamp device together as a completely preassembled ready-to-mount unit without any loose parts, the head of the screw being located at the end to be fastened to the support and being arranged to be carried through a hole or groove in the support, the hole or groove being adapted to the head, and to be locked thereto by tightening of the nut, wherein the base member has first and second block-shaped halves at least one of which has at least one said recess for receiving the element or elements in a clamping manner between the halves when these halves are pressed against each other, and wherein one said half is nearest to the support and wherein each of the hole or holes through the halves is formed with a radial enlargement along at least a part of the length of said hole, so that the head of said locking screw can pass either at least partly into the half nearest to the support or through the half nearest to the support and partly into the other half to allow a limited relative movement of the halves and a lateral introduction of the element into the at least one recess.

2. A clamp device according to claim 1, wherein the base halves are provided with at least one pair of mutually facing, cooperating recesses for receiving a respective one of the elements, and wherein at least one of the cooperating recesses has an opening having a constriction portion for gripping and retention of the element inserted into the recess.

3. A clamp device according to claim 1 or 2, wherein said device comprises two said locking screws each extending through a respective aligned pair of said holes in the top plate and the base halves on either side of the at least one recess.

4. A clamp device according to claim 1 or 2, wherein said device comprises a single said locking screw extending through an aligned pair of said holes in the top plate and the base halves on one side of the at least one recess.

5. A clamp device according to claim 1 or 2, wherein the two halves of the base member are connected to each other at a hinge portion located at one side edge of the halves and having a hinge axis which is essentially parallel with the longitudinal axis of the recesses.

6. A clamp device according to claim 3, wherein the radial enlargement of one said pair of said holes in the two halves extends through the entire half nearest to the support and a limited distance into the other half, whereas the radial enlargement of each hole of the other pair of said holes extends only a chosen distance into the half nearest to the support.

7. A clamp device according to claim 4, wherein the radial enlargement of the pair of said holes in the two halves extends a chosen distance into the half nearest to the support.

8. A clamp device according to claim 3, wherein the two halves of the base member are connected to each other at a hinge portion located at one side edge of the halves and having a hinge axis which is essentially parallel with a longitudinal axis of the at least one recess, and wherein the radial enlargement of each hole of the respective pairs of said holes in the two halves extends through the entire half nearest to the support and a limited distance into the other half.

9. A clamp device according to claim 4, wherein the two halves of the base member are connected to each other at a hinge portion located at one side edge of the halves and having a hinge axis which is essentially parallel with a longitudinal axis of the at least one recess, and wherein the radial enlargement of each hole of the pair of said holes in the two halves extends through the entire half nearest to the support and a limited distance into the other half.

10. A clamp device according to claim 3 wherein the two halves of the base member are connected to each other at a hinge portion located at one side edge of the halves and having a hinge axis which is essentially parallel with the longitudinal axis of the recesses and wherein each half has a single recess, this recess also having a laterally debouching portion on the side of the half located opposite to the hinge portion, so that a lateral introduction opening for an element is formed, the radial enlargement of each hole of the pair of said holes at the laterally debouching portions extending through the entire half nearest to the support and a limited distance into the other half, whereas the other pair of aligned holes is without a radial enlargement.

11. A clamp device according to claim 1 or 2, wherein the locking screw is a so-called T-screw having a laterally projecting head portion, and wherein the radial enlargement consists of diametrically opposite, axially extending spaces to make room and passage for the projecting head portion.

12. A clamp device according to claim 1 or 2, wherein the top plate is made of metal and is shaped as a strap having legs which are adapted to project down to the support along opposite side portions of the halves on each side of a clamped element.

13. A clamp device according to claim 1 or 2, wherein said device comprises a separate top plate adapted to be inserted under the first-mentioned top plate of the clamp device so as to be parallel to a longitudinal axis of the at least one recess, the separate top plate having at least one outwardly open cutout for receiving the locking screw, and further having a portion which, in the mounted position of the separate top plate, projects outside the base member and which is provided with at least one hole or groove for introduction and locking of an additional (a respective) locking screw on an additional corresponding claim device.

* * * * *